United States Patent [19]

Block

[11] 4,428,845

[45] Jan. 31, 1984

[54] VISCOSIFIER AND FLUID LOSS CONTROL SYSTEM

[75] Inventor: Jacob Block, Rockville, Md.

[73] Assignee: W. R. Grace & Co., New York, N.Y.

[21] Appl. No.: 326,876

[22] Filed: Dec. 2, 1981

[51] Int. Cl.$^3$ .............................................. C09K 7/02
[52] U.S. Cl. .............................. 252/8.5 A; 252/8.5 C
[58] Field of Search .............. 252/8.5 A, 8.5 B, 8.5 C, 252/8.55 R; 525/61

[56] References Cited

U.S. PATENT DOCUMENTS

| | | | |
|---|---|---|---|
| 3,756,315 | 9/1973 | Suman et al. | 166/276 |
| 3,860,070 | 1/1975 | Herce et al. | 166/292 |
| 3,872,018 | 3/1975 | Alexander | 252/8.5 |
| 4,045,357 | 8/1977 | Reed | 252/8.5 |
| 4,240,915 | 12/1980 | Block | 252/8.5 |
| 4,349,443 | 9/1982 | Block | 252/8.5 |
| 4,389,319 | 6/1983 | Block et al. | 252/8.5 |

FOREIGN PATENT DOCUMENTS 356408  9/1931  United Kingdom .................. 525/61

*Primary Examiner*—Herbert B. Guynn
*Attorney, Agent, or Firm*—Howard J. Troffkin; W. W. McDowell, Jr.

[57] ABSTRACT

A composition capable of imparting pseudoplasticity and fluid loss control properties to aqueous systems. The composition is formed from a combination of:

(a) a hydroxy containing aluminum component and
(b) a reaction product of a polyaldehyde and a polyvinyl alcohol, said polyaldehyde present in from 0.01 to 0.1 percent of stoichiometry;

wherein the amount of component (a) to component (b) is in the weight ratio capable of directly forming, when mixed with sufficient water, an aqueous system having from about 0.5 to 10 weight percent of component (a) and from about 0.3 to 5 weight percent of component (b) based on the weight of the water of the system.

The invention is further directed to improved drilling fluids containing said composition and to the process of drilling bore holes using said improved fluid.

11 Claims, No Drawings

VISCOSIFIER AND FLUID LOSS CONTROL SYSTEM

BACKGROUND OF THE INVENTION

The present invention relates to a composition which is capable of imparting non-Newtonian, pseudoplasticity and water loss controlling properties to aqueous systems. More particularly, the present invention relates to the formation of an improved water-based, clay-free drilling fluid containing the subject composition and to an improved method of drilling bore holes into subterranean formations using said drilling fluid.

In normal well drilling operations in which a well is drilled by a rotary method, the well bore hole is generally filled with a drilling fluid or mud which is circulated therein. Drilling fluids are usually pumped down through the drill stem of the rotary rig, circulated around the drill bit and returned to the surface through the annular passage between the drill stem and well wall. These drilling fluids perform a number of functions including lubricating the drill stem and bit, cooling the bit, carrying the cuttings from the bit up the bore hole to the surface where the cuttings may be separated and disposed of, and providing a hydrostatic head against the walls of the well to contain downhole geopressure.

A primary requisite of a satisfactory drilling fluid is its ability to readily circulate and flow, that is, to have low viscosity, under the high sheer conditions which are present in the environs of the drill bit while, at the same time, being capable of having and maintaining sufficient viscosity to be capable of efficiently carrying the bit cuttings to the surface.

A typical fluid composition contains various agents to impart needed properties to the fluid at different stages in the drilling operation. The drilling fluid must also be capable of inhibiting the amount of liquid, normally water, which is lost into the porous strata through which the bore hole traverses. The loss of liquid causes the formation and build-up of a cake deposit which, after a period of time, can cause sticking of the drill pipe and stoppage of the drilling operation. The fluid must, therefore, be of a nature which permits minimum loss into the porous strata. Agents which impart such property are conventionally termed "water loss controllers" or "fluid loss controllers".

The drilling fluid must also be capable of exhibiting the above-described water-loss and pseudoplastic properties under changing composition and environmental conditions encountered during the drilling operation due to the fact that the bore hole traverses various strata such as shales, clay, etc., and the cuttings of these materials become dispersed in the fluid media. The drilling fluid components should be substantially stable to the presence of various calcium compounds and to sodium chloride which may be present in the fluid from the soil strata with which it is in contact and/or due to the use of salt water having calcium or sodium salts therein used in forming the drilling fluid.

It is desired that the drilling fluid components should be stable and functional at elevated temperature. It is well known that as the bore hole increases in depth the temperatures encountered are substantially above that found at the earth's surface. Further, heat is generated by frictional forces on the drill bit. It is, therefore, desired that components used in forming drilling fluids be stable with respect to varying elevated temperature conditions.

Due to the large quantities of material needed, the remote areas of the drill site and other factors, cost and effectiveness of the material is of prime concern.

A wide variety of drilling fluids have been used, including aqueous-based liquids, hydrocarbon based liquids, air and other gases, mist, foams and the like. Since great volumes of drilling fluids are required for the purposes of providing a cooling medium for the rotary bit and a means of carrying off the drilled particles, most of the conventional fluids used have been based on water. Water alone being a Newtonian fluid, does not have the needed capability to efficiently carry the drilled particles from the bore hole to the surface nor the capacity of inhibiting loss of fluid into adjacent porous strata.

It is a widely held and accepted theory that the viscosities suitable for creating a particle carrying capacity in the fluid can be achieved with the drilling fluid having pseudoplastic properties. For example, the drilling fluid must be capable of having a low viscosity under the high shear rates such as encountered at the drill bit, yet have the ability to increase in viscosity (and, therefore, particle holding power) under decreasing shear rates encountered in its upward movement through the annulus.

In order to obtain the requisite pseudoplastic properties, it has been thought desirable to use clay or colloidal clay bodies such as bentonite. As a result, the drilling fluids have been usually referred to as "muds". The use of clay based drilling fluids has provided the means of initially meeting the two basic requirements of drilling fluids, i.e., cooling and particle removal. However, the clay-based drilling fluids are highly unstable when they come in contact with various salts found in drilled earth formations.

Materials which have come into expanding use to impart rheological properties to drilling compositions are xanthan gums such as are described in U.S. Pat. Nos. 3,198,268; 3,208,526; 3,251,147; 3,243,000; 3,307,016; 3,319,715 and 3,988,246. These materials have been found to cause aqueous solutions, such as drilling fluids, to exhibit pseudoplastic properties under varying low shear rates. However, these materials, whether used alone or in combination with other additives, present the problem of being irreversibly degraded by the elevated temperatures often encountered during conventional drilling operations and thereby require continuous supplementation of material. The high cost of the xanthan gums, and the high rate of degradation, limit their usefulness to specialized operations.

Prior utilization of hydroxides or hydrated metal oxides of amphoteric metals in well treating fluids have involved properties distinctly different from the properties required for a drilling fluid as described herein. For example, U.S. Pat. Nos. 3,614,985 and 3,815,681 describe a process for plugging a subterranean reservoir by permeating its pores with a solution containing an amphoteric metal salt and a pH increasing reactant to cause precipitation in the pores. U.S. Pat. No. 3,603,399 describes a process for treating a water sensitive formation by permeating its pores with a hydroxy-aluminum solution which is a clear and relatively non-viscous solution. In each of such prior well treating processes, it has been important that the solution have relatively low viscosity and high filter loss to ensure that the solution penetrates into the matrix or pores of the reservoir. In contrast, in a drilling fluid, it is important that the fluid be capable of having a high viscosity over the major region of its use (the annular region of the drill stem), exhibit a low viscosity at the drill bit site and be capable of not penetrating the formation and thereby leaving a filter cake over the entire bore hole. U.S. Pat. No. 3,860,070 describes a well completion or fracturing fluid containing an amphoteric metal salt and a base in a ratio to make the final solution strongly acidic in order to form a thickened fluid suitable as a fracturing fluid. Such fluids can not be used satisfactorily in a drilling operation due to their corrosive nature with respect to the metal drilling equipment. None of the various well treating fluids described in the above references would be suitable for their intended purpose if they contained a fluid loss agent.

U.S. Pat. No. 4,240,915 to J. Block teaches that certain hydroxy containing aluminum agents are effective viscosifiers for water-based drilling fluids. Such agents provide enhanced rheological properties but do not exhibit fluid loss control and thereby do not provide the desired combination of properties required to form an effective drilling mud.

The viscosity of a drilling fluid has been relied upon as a mode of aiding in fluid loss control with little success especially when drilling into and through porous substrates. To enhance the control, various agents have been added. For example, in U.S. Pat. No. 3,032,498 a cyanoethylated starch was described as a water loss controller when used in combination with a clay-based mud. U.S. Pat. No. 3,988,246 describes an esterified or etherified starch as a water loss controlling agent which is compatible with a xanthan gum based drilling mud. Other starches have been employed in clay free muds under limiting temperature conditions as starches are known to be temperature sensitive.

There is a general need for a composition which is capable of imparting both pseudoplastic and water loss controlling properties to aqueous compositions such as drilling fluid compositions. The composition should be stable to varying conditions and temperatures commonly encountered in drilling operations and must be easily produced at low cost to aid in the economics of drilling operations.

SUMMARY OF THE INVENTION

The present invention is directed to a composition capable of imparting both pseudoplasticity and water loss control to alkaline aqueous systems. The composition is a combination of:

(a) a hydroxy containing aluminum agent formed by mixing in an aqueous solution and under a high degree of agitation a water soluble basic agent selected from an alkali metal aluminate, alkali metal hydroxide or ammonium hydroxide with a water soluble acidic agent selected from an inorganic acid, or aluminum chloride, sulfate or nitrate such that at least one of said basic and acidic agent is an aluminum containing compound; and (b) a reaction product formed in an acidic medium between a polyvinyl alcohol with from 0.01 to 0.1 percent of stoichiometry of a polyaldehyde.

The subject combination imparts pseudoplastic and water loss controlling properties unattributable to each of the components and is stable to elevated temperature and conditions commonly encountered in bore hole drilling operations.

DETAILED DESCRIPTION OF THE INVENTION

The present invention is directed to a composition which is capable of imparting a high degree of pseudoplastic and water loss controlling properties to aqueous systems; to the use of such compositions to form an improved water-based, clay-free drilling fluid; and to drilling of bore holes into subterranean formations using said improved drilling fluid.

The subject composition is a combination of a hydroxy containing aluminum agent and a polyvinyl alcohol/polyaldehyde reaction product. The subject composition shall be described in terms of its use as a component of a drilling fluid.

The hydroxy containing aluminum agents found useful as a component of the composition of the present invention are agents which are substantially water-insoluble, that is, agents which are in suspension or dispersion in aqueous systems. Further, the subject hydroxy containing aluminum agents can be characterized as having an x-ray diffraction spectrum containing a major characterizing diffraction peak at 6.3±0.2 Angstroms or characterized by x-ray diffraction spectrum as being amorphous, that is, having substantially no x-ray diffraction pattern within the range of from 1.5 to 17 Angstroms. The spectrum is determined by standard techniques using the K-doublet of copper as the radiation source.

The subject hydroxy containing aluminum agent of the subject invention is formed by contacting certain acidic agents with certain basic agents, as described below, in an aqueous medium under a high degree of agitation. The acidic and basic agents should be used in a ratio such that the resultant product is capable of imparting a pH of from about 8 to 10.3 to the water medium.

The basic agents useful in forming the hydroxy-containing aluminum component can be a water soluble basic material selected from an alkali metal aluminate, alkali metal hydroxide or ammonium hydroxide or mixtures thereof. Any alkali metal can be used such as sodium, potassium and the like with sodium being preferred.

The acidic agent useful in forming the hydroxy-containing aluminum component can be a water soluble acidic material selected from an inorganic acid as, for example, hydrochloric, sulfuric or nitric acid and the like, or an aluminum salt selected from aluminum chloride, aluminum nitrate or aluminum sulfate, their hydrates or mixtures of these acidic agents. At least one and preferably both the acidic and basic agents must be an aluminum containing agent. For example the hydroxy containing aluminum component may be formed from an alkali metal aluminate, such as sodium aluminate, and aluminum chloride hexahydrate in an aqueous system. The sodium aluminate is mixed with the aluminum chloride hexahydrates in an aqueous phase under high speed mixing. The aluminates which are useful normally will have an alkali metal oxide to aluminum oxide mole ratio of from about 1:1 to 2:1. These materials are commercially available. If desired, solutions of one or both components can be made and then mixed together under high speed mixing to form the hydroxy containing aluminum agent.

The acidic and basic precursor agents can be present in concentrations of from about 5 to 25 percent by weight based on the water present. The concentration can vary outside of this range but should not be such as to inhibit the thorough mixing, preferably under high speed agitation, of the agents during the formation of hydroxy-containing aluminum component. The acidic and basic agents can be mixed using conventional equipment which can generate a high degree of agitation to the aqueous medium. The ratio of acidic and basic component should be such that a final pH of 8 to 10.3 and preferably 8.3 to 9.7 is obtained. The resultant aluminum component has hydroxyl groups as an integral part of its composition.

The polyvinyl alcohol reaction product found useful in forming the subject inventive composition is formed by contacting polyvinyl alcohol and a polyaldehyde. The polyvinyl alcohols found useful in forming the subject reaction product have a weight average molecular weight of at least about 20,000 and preferably the weight average molecular weight should be from about 90,000 to 200,000. Conventionally polyvinyl alcohol is the hydrolyzed product of polyvinyl acetate. The hydrolysis should be at least about 75 percent complete and preferably from about 80 to 95 percent complete to form a suitable polyvinyl alcohol reactant.

The polyaldehyde required to form the desired polyvinyl alcohol/polyaldehyde reaction product is an organic compound represented by the general formula:

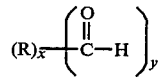

wherein R is an organic radical capable of forming at least two covalent bonds with carbonyl groups. R can be selected from organic saturated or unsaturated aliphatic cycloaliphatic, aromatic or heterocyclic radicals, x is an integer of 0 or 1 and y is an integer of at least 2. The upper value of y is dependent on the capability of R to form covalent bonds with carbonyl groups. The preferred polyaldehydes are dialdehydes wherein R is a divalent hydrocarbon having from 1 to 12 carbons and preferably from 1 to 6 carbons, as for example, malonaldehyde, succinaldehyde, glutaraldehyde, adipaldehyde, malealdehyde, fumaraldehyde, phthalaldehyde and the like. Preferred materials are malonaldehyde and glutaraldehyde. In addition, the dialdehyde having the above general formula wherein x is 0 which is known as glyoxal is also a preferred material.

The subject polyvinyl alcohol reaction product found suitable in the subject composition to impart the combined desired properties can be formed by reacting a polyvinyl alcohol, as described above, with from 0.01 to 0.1 percent and preferably from about 0.02 to 0.06 percent of stoichiometry of the above described polyaldehyde based on the hydroxyl content of the polyvinyl alcohol. Higher and lower stoichiometric amounts produce materials which inhibit the ability to form the desired composition. The use of higher stoichiometric amounts has been found to produce products which precipitate out causing loss of fluid loss controlling properties. Lower stoichiometric amounts also produce inferior products. We define stoichiometry as the reaction of 2 OH groups with one aldehyde group. The reaction to form the polyvinyl alcohol reaction product should be carried out in an aqueous medium which is acidic, that is, having preferably a pH of less than 2.5 and preferably is from 1 to 2.5 and which may contain other components, such as alkali metal sulfates in from 1% to saturation, to aid in the formation of the polymer product. The reaction can be carried out at ambient or elevated temperatures, such as from about 50° C. to 100° C. The solid product can be recovered by conventional techniques such as by salting out the product using suitable salts as, for example, sulfate, carbonate or phosphate salts, decantation, filtration and drying.

Compositions of the subject hydroxy-containing aluminum agent and the polyvinyl alcohol/aldehyde reaction product have unexpectedly been found to exhibit a combination of desired properties of pseudoplasticity and water-loss control which are unattainable by separate use of the materials or unattributable to the combination of the properties of each agent when used separately.

The presently described polyvinyl alcohol/aldehyde reaction products do not, when used alone, exhibit and impart water-loss control or pseudoplasticity to aqueous systems such as water-based clay-free drilling fluids.

It has been presently unexpectedly found that when the polyvinyl alcohol/polyaldehyde reaction product is combined with the hydroxy-containing aluminum agent one unexpectedly attains equal or superior pseudoplastic properties and an exceptionally high degree of water-loss control not attributable to either component.

The aqueous drilling fluid composition which contains the subject composition should have an alkaline pH of from 8 to about 11.5 and preferably from 8.3 to 10.3. At these alkaline pH conditions, one attains the desired properties. Adjustment of the pH can be done with any water soluble inorganic base or acid such as alkali metal hydroxide or carbonate, alkaline earth metal hydroxide or a hydrohalic acid, sulfuric acid, nitric acid or sodium bicarbonate.

The aqueous system should be mixed to the extent required to cause the components of the composition to be substantially uniformly distributed therein. Further, the hydroxy aluminum containing aqueous medium or preferably the resultant composition containing system may have the combined described properties further enhanced by subjecting the system to mixing at high shear rates of about 20,000 sec.$^{-1}$ or greater for short periods of time such as from about 5 to 60 minutes as by circulating the aqueous system through a small internal diameter tube at high rate.

The aqueous medium in which the above-described hydroxy-containing aluminum agent is formed can be directly used to form the water-based drilling fluids of the subject invention. The aqueous medium can be diluted with a sufficient amount of water to form a system having from 0.5 to 10 percent, and preferably from 1.5 to 3.5 percent, by weight based on the weight of the water of the resultant hydroxy aluminum compound assuming a molecular formula of AlO(OH) for the hydroxy aluminum compound. The concentration most suitable can be readily determined in conventional manners by the mud engineer taking into consideration the concentration and nature of other materials which may also be contained in the drilling fluid.

The polyvinyl alcohol/polyaldehyde reaction product can be used in any effective amount which, when combined with the amount of aluminum component present, imparts water-loss control to the resultant aqueous system. Normally from 0.3 to 5 percent and preferably from 0.75 to 2 percent polyvinyl alcohol/polyaldehyde reaction product based on the weight of the water of the resultant aqueous system. The concentration most suitable can be readily determined in conventional manners.

The above-described composition is capable of imparting to a clay-free, (the term "clay-free" when used herein refers to the absence of drilling fluid viscosifying clays as an essential agent of the fluid and not to other materials entrained therein) aqueous system, such as a water-based drilling fluid (the term "fluid" or "system" when used herein refers to water-based systems containing the subject composition) non-Newtonian, pseudoplasticity, that is to say, that the viscosity of the resultant fluid varies inversely with respect to the shear rate exerted on the fluid. The relationship of the shear stress with respect to shear rate can be defined by the rheological power law model relationship of $$\tau = K(\dot{\gamma})^n$$

in which $\tau$ represents the shear stress exerted on the aqueous system of the drilling fluid in units such as pounds per 100 ft$^2$ or dynes/cm$^2$; $\dot{\gamma}$ is the shear rate in units of reciprocal time such as sec$^{-1}$; K is a constant having the value of the shear stress of the particular aqueous system at a shear rate of 1 sec$^{-1}$; and n is a numerical value greater than zero. When n=1, the system is Newtonian; if n is less than 1, the system is pseudoplastic, and if n is greater than 1, the system is dilatant. It has been unexpectedly found that fluids containing the presently described composition exhibit shear stress ($\tau$) properties at varying shear rates ($\dot{\gamma}$) in the range of from about 10 to 400 sec$^{-1}$, that is, in the range normally encountered in the annular region of the bore hole such that n of the power law relationship has a value of less than about 0.4. Such systems, therefore, exhibit non-Newtonian, pseudoplastic properties to an exceptionally high and desirable degree.

The above-described composition has been unexpectedly found to exhibit a high degree of fluid loss control. That is to say that the fluid is capable of interacting with the adjacent porosity to inhibit loss of the fluid to the porous environment. The subject composition is most effective under the adverse conditions of high temperature which are encountered in bore holes. The fluid loss of the system can be determined in accordance with the American Petroleum Institute's procedure API No RP-13B. After initial spurt, the desired water loss control attained with the subject composition is of less than about 10 ml per 30 minutes after having been subjected to elevated temperatures. It is also highly desired to form a fluid loss controller which inhibits any large initial loss of fluid, i.e. spurt, from the system.

The drilling fluid composition of the subject invention can contain other conventional drilling fluid additives such as weighting agents as, for example, crushed oyster shells, barite and the like; thinner such as ferrochrome lignosulfonate and the like; lost-circulation agents such as ground walnut shells, cotton seed hulls and the like; pH adjusters such as MgO, sodium carbonate, sodium bicarbonate and the like; as well as other conventional additives.

The term "water-based" which is used herein in describing the present invention, generally includes drilling fluids which have a liqud base comprising substantially fresh water or salt water. However, it is to be realized that at times certain small amounts of other liquids may be emulsified or admixed with the water-based fluid. For example, drilling fluids may at times contain small amounts of oil, emulsified or admixed with the drilling fluid, the oil coming either from an oil formation drilled into or, under certain conditions, can be purposely added.

The subject composition can be used with conventional bore hole drilling equipment in manners known to those skilled in the art to efficiently and effectively drill bore holes into subterranean formations. The pseudoplastic and water loss control properties of drilling fluids containing said composition permit effective removal of the cuttings from the area at and around the drill bit to permit more efficient drilling of the formation when circulating the fluid during bore hole drilling.

The following examples are given for illustrative purposes only, and are not meant to be a limitation on the subject invention except as indicated by the appended claims. All parts and percentages are by weight unless otherwise indicated. The units of K of the power law is lb-sec/100 ft$^2$.

EXAMPLE I

Formation of Polyvinyl Alcohol/Polyaldehyde Product

A. 50 parts of a commercially available polyvinyl alcohol (PVA) having a weight average molecular weight of 125,000 and 87% hydrolyzed (Gelvatol 20-90) was dispersed in 150 parts of a 16 percent aqueous solution of sodium sulfate. The pH of the aqueous solution was adjusted to 1.5 with dilute sulfuric acid prior to addition of the PVA. 0.87 part of a 1 percent aqueous solution of glyoxal (0.05 percent of stoichiometry) was added to the solution which was then heated to 80° C. while stirring for about 10 minutes. The system containing the reaction product was filtered while hot and then dried.

B. The above was repeated except that the glyoxal solution was substituted with 0.3 part of a 5% aqueous solution of glutaraldehyde (0.05 percent of stoichiometry).

EXAMPLE II

Formation of Hydroxy-Containing Aluminum Agent 15.3 parts of commercially obtained sodium aluminate (Na$_2$O.Al$_2$O$_3$.3H$_2$O) powder was mixed with 12.2 parts of commercially obtained aluminum chloride hexahydrate powder. The mixture was added to 350 parts water and subjected to high speed mixing using a Hamilton Beach Model 936-2 mixer for 20 minutes. The aqueous dispersion was allowed to sit for 16 hours and then again subjected to high speed mixing for 5 minutes. The pH of the resultant dispersion was 8.5 and was adjusted to 9.5 with dilute NaOH.

The hydroxy-containing agent concentrations will be determined herein below based on the formula AlO(OH) although the subject agent may be present in other forms.

EXAMPLE III

For comparative purposes, aqueous samples of hydroxy-containing aluminum and of polyvinyl alcohol/aldehyde reaction products, respectively, were tested for rheology and water-loss control.

An aqueous system having 3 percent hydroxy-containing aluminum product therein (prepared according to Example II above) and having a pH of 9.5 was subjected to rheological analysis using standard procedures with a Haake Rotovisco RV-1 rotating rheometer at varying shear rates of from 8 to 800 sec$^{-1}$ and at 25° C.

The values determined for n and K was 0.28 and 3.0, respectively in accordance with the power law model relationship $\tau = K(\dot{\gamma})^n$ in which $\tau$ represents shear stress exerted on the aqueous system in units of pounds per 100 ft$^2$ on dynes per centimeter square; $\dot{\gamma}$ is the shear rate in units of reciprocal times such as sec$^{-1}$; K is a constant having a value of shear stress at a shear rate of one sec$^{-1}$ and has units of pound-seconds/100 ft$^2$; and n is a numerical value of from 0 to 1. Pseudoplastic systems have a value for n of less than about 0.4. The fluid loss control of the material was determined using American Petroleum Institute (API) procedure RP 13B at 100 psi and 25° C. A fluid loss control value of greater 200 ml/30 minute was obtained. The product imparted good pseudoplasticity but substantially no fluid loss control.

The polyvinyl alcohol/polyaldehyde products of Example I were diluted with water to form aqueous systems having 1.5 percent PVA/A. The rheology and fluid loss control were determined in the same manner and procedures described with respect to the hydroxy-containing aluminum compound herein above. The materials were found to be Newtonian (n=1, K=<0.1), and to have a fluid loss of greater than 200 ml/30 minutes. The PVA/A reaction products do not impart pseudoplasticity nor fluid loss control.

EXAMPLE IV

This example illustrates that aqueous systems containing a mixture of the hydroxy-containing aluminum compound and the polyvinyl alcohol/polyaldehyde reaction product exhibit both good rheology and good fluid loss control and are stable even when subjected to elevated temperatures for sustained periods of time.

An aqueous composition was formed which contained a uniform mixture of 2.4 percent hydroxy-containing aluminum product [symbolized as A10(OH)] prepared as described in Example II and 1.6 percent polyvinyl alcohol-glyoxal product as described in Example I A. A sample (Sample 1) was taken of the composition to determine its rheology and fluid loss control at 25° C. by the methods described in Example III. A second sample (Sample 2) of the composition was placed in a vessel under a N$_2$ atmosphere, sealed and subjected to 122° C. (250° F.) for 16 hours while under constant agitation and then allowed to cool to room temperature. The rheology and fluid loss control of the heat-treated composition were determined. Sample I exhibited the values for n of 0.16; for K of 33.0; for Total Fluid Loss (TFL) of 14.9 and of spurt of 2.0. Sample II exhibited the values for n of 0.20; for K of 11.2; for TFL of 7.8 and had no spurt. The sample shows good rheology and fluid loss control especially after subjection to elevated temperatures.

EXAMPLE V

The procedures described in Example IV above were repeated except that the compositions were formed with the polyvinyl alcohol product formed according to Example I (B). The results obtained from the Sample I (room temperature, as formed) where n was 0.16; K was 43.0; TFL was 14.0 and spurt was 1.8. The results of Sample II (after 16 hrs. at 250° F. under agitation) where n equaled 0.25; K equaled 5.4; TFL equaled 8.4 and spurt was 0.2.

While the invention has been described in connection with certain preferred embodiments, it is not intended to limit the invention to the particular forms set forth but, on the contrary, it is intended to cover such alternatives, modifications and equivalents as defined by the appended claims.

I claim:

1. A composition capable of imparting to aqueous systems a combination of pseudoplasticity and fluid loss control comprising a mixture of:
   (a) a hydroxy containing aluminum component formed by mixing in an aqueous medium and under a high degree of agitation a water-soluble basic agent selected from the group consisting of an alkali metal aluminate, alkali metal hydroxide, ammonium hydroxide and mixtures thereof with a water-soluble acidic agent selected from an inorganic acid, aluminum chloride, aluminum sulfate, aluminum nitrate, their hydrates and mixtures thereof; at least one of said basic and acidic agents being an aluminum containing compound: said acidic and basic agents being reacted in a ratio such that the resultant product is capable of imparting to an aqueous medium a pH of from at least about 8 to about 10.3 in combination with
   (b) a reaction product formed in an aqueous acidic medium having a pH of less than about 2.5 between a polyvinyl alcohol having a weight average molecular weight of at least 20,000 with from 0.01 to 0.1 percent of stoichiometry of a polyaldehyde of the general formula

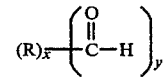

wherein R is an organic radical capable of forming at least two covalent bonds with carbonyl groups, x is an integer of 0 or 1 and y is an integer of at least 2; wherein the amount of component (a) to component (b) is in a weight ratio capable of directly forming an aqueous system having from about 0.5 to 10 weight percent of component (a) and from about 0.3 to 5 weight percent of component (b) based on the weight of the water in the system.

2. The composition of claim 1 wherein the reaction product (b) is formed in an aqueous medium having a pH of from 1 to 2.5, and wherein the polyaldehyde is selected from a compound such that R is a $C_1$-$C_{12}$ divalent hydrocarbon radical, x is 1 and y is 2 or glyoxal.

3. The composition of claim 1 wherein the polyvinyl alcohol has a weight average molecular weight of from about 90,000 to 200,000 and is at least about 75 percent hydrolyzed.

4. The composition of claim 1 wherein the polyaldehyde is selected from glyoxal and glutaraldehyde and used in from about 0.02 to 0.06 percent of stoichiometry, the polyvinyl alcohol being at least 75 percent hydrolyzed.

5. The composition of claim 1 wherein the aqueous medium contains an alkali metal sulfate in from 1 percent by weight to saturation.

6. The composition of claim 2 wherein the aqueous medium contains an alkali metal sulfate in from 1 percent by weight to saturation.

7. The composition of claim 3 wherein the aqueous medium contains an alkali metal sulfate in from 1 percent by weight to saturation.

8. The composition of claim 4 wherein the aqueous medium contains an alkali metal sulfate in from 1 percent by weight to saturation.

9. In a water-based, clay-free drilling fluid suitable for circulating in a bore hole while drilling the bore hole into subterranean formations which include, water, a rheology enhancing agent and a fluid-loss controller, said improvement comprises that said rheology enhancing agent and fluid-loss controlling agent are, in combination, the composition of claim 1, 2, 3, 4, 5, 6, 7 or 8 present in said fluid in from about 1 to 15 percent by weight based on the weight of the water present in said fluid and said fluid is maintained at a pH of from about 8 to 11.5.

10. The drilling fluid of claim 9, wherein the aqueous fluid has a pH of from 8.3–10.3.

11. In a process of drilling a bore hole into a subterranean formation using conventional bore hole drilling equipment, the improvement comprising circulating in the bore hole while drilling the drilling fluid of claim 9.

* * * * *